United States Patent
Monji et al.

(10) Patent No.: US 11,461,506 B2
(45) Date of Patent: Oct. 4, 2022

(54) STORAGE SYSTEM AND ENCRYPTION PROCESSING METHOD

(71) Applicant: Hitachi, Ltd., Tokyo (JP)

(72) Inventors: Hideaki Monji, Tokyo (JP); Yuusaku Kiyota, Tokyo (JP)

(73) Assignee: HITACHI, LTD., Tokyo (JP)

( * ) Notice: Subject to any disclaimer, the term of this patent is extended or adjusted under 35 U.S.C. 154(b) by 171 days.

(21) Appl. No.: 17/029,340

(22) Filed: Sep. 23, 2020

(65) Prior Publication Data
US 2021/0264063 A1 Aug. 26, 2021

(30) Foreign Application Priority Data

Feb. 20, 2020 (JP) .............................. JP2020-027615

(51) Int. Cl.
| | |
|---|---|
| *G06F 21/78* | (2013.01) |
| *G06F 11/10* | (2006.01) |
| *G06F 11/08* | (2006.01) |
| *G06F 21/60* | (2013.01) |
| *G06F 12/14* | (2006.01) |

(52) U.S. Cl.
CPC .......... *G06F 21/78* (2013.01); *G06F 11/1044* (2013.01); *G06F 12/1408* (2013.01); *G06F 21/602* (2013.01); *G06F 2221/0753* (2013.01); *G06F 2221/0755* (2013.01)

(58) Field of Classification Search
None
See application file for complete search history.

(56) References Cited

U.S. PATENT DOCUMENTS

| | | | | |
|---|---|---|---|---|
| 6,049,612 A | * | 4/2000 | Fielder .................. | H04L 9/3236 380/44 |
| 2002/0129246 A1 | * | 9/2002 | Blumenau ............. | G06F 21/602 713/168 |

(Continued)

FOREIGN PATENT DOCUMENTS

JP 2007-124530 A 5/2007

OTHER PUBLICATIONS

Implementation of 4-Bit Data Transmission for Accessing SD Card with FPGA Embedded Soft Processor. Ujjan. ACM. (Year: 2019).*

(Continued)

*Primary Examiner* — Venkat Perungavoor
(74) *Attorney, Agent, or Firm* — Mattingly & Malur, PC (57) ABSTRACT

Encryption is enabled at a low load in a storage system. An encryption processing device 20 uses, as an expectation value for key validation, a value that is uniquely identified from a storage location address of encrypted text data in a storage drive. The encryption processing device 20 encrypts the expectation value and plain text data, respectively, using a same encryption key, substitutes a DIF according to the encrypted text data obtained by encrypting the plain text data, and stores the encrypted expectation value in the substituted DIF. Upon receiving a read request of the encrypted text data, the encryption processing device 20 decrypts the encrypted expectation value stored in the substituted DIF using a decryption key, and validates whether the encryption key and the decryption key are properly corresponding by comparing the decrypted expectation value and the expectation value identified from the address at the time of reading.

7 Claims, 12 Drawing Sheets

(56) References Cited

U.S. PATENT DOCUMENTS

| | | | |
|---|---|---|---|
| 2003/0200448 A1* | 10/2003 | Foster | G06F 21/64 |
| | | | 726/30 |
| 2007/0192624 A1 | 8/2007 | Ikeda | |
| 2015/0249467 A1* | 9/2015 | Nakanishi | H04L 9/0894 |
| | | | 714/800 |
| 2020/0226270 A1* | 7/2020 | Benedict | G06F 3/0659 |

OTHER PUBLICATIONS

SSD-Insider: Internal Defense of Solid-State Drive against Ransomware with Perfect Data Recovery. Baek. IEEE. (Year: 2018).*
FlashGuard: Leveraging Intrinsic Flash Properties to Defend Against Encryption Ransomware. Huang. ACM. (Year: 2017).*

* cited by examiner

| Word | Bit | NAME | MEANING |
|---|---|---|---|
| 0 | 31:28 | IO_CMD | COMMAND TYPE (ENCRYPTION/DECRYPTION/OTHER) |
|  | 23:16 | DEK_INDEX | KEY NUMBER |
| 2:3 | 63:0 | SRC_ADR | READ SOURCE ADDRESS OF DATA |
| 4:5 | 63:0 | DEST_ADR | WRITE DESTINATION ADDRESS OF DATA |
| 6 | 7:0 | CHK_ATAG1 | STORAGE OF EXPECTATION VALUE TO BE READ DURING "Read" |
| 8 | 7:0 | GEN_ATAG1 | STORAGE OF EXPECTATION VALUE TO BE WRITTEN DURING "Write" |

FIG. 6

| FINAL STORAGE MEDIUM NUMBER | KEY NUMBER | LOGICAL ADDRESS | EXPECTATION VALUE |
|---|---|---|---|
| 0 | X | 0xXXXXXXXX | XXh |
| | | 0xYYYYYYYY | YYh |
| | | 0xZZZZZZZZ | ZZh |
| | | .... | .... |
| 1 | Y | 0xXXXXXXXX | XXh |
| | | 0xYYYYYYYY | YYh |
| | | 0xZZZZZZZZ | ZZh |
| | | .... | .... |
| 2 | Z | 0xXXXXXXXX | XXh |
| | | 0xYYYYYYYY | YYh |
| | | 0xZZZZZZZZ | ZZh |
| | | .... | .... |
| ... | ... | ... | ... |

| KEY NUMBER | KEY α (Data Encryption Key) | KEY β (Initialization Vector Key) |
|---|---|---|
| X | <256Bit pseudorandom numbers> | <256Bit pseudorandom numbers> |
| Y | <256Bit pseudorandom numbers> | <256Bit pseudorandom numbers> |
| Z | <256Bit pseudorandom numbers> | <256Bit pseudorandom numbers> |
| .... | .... | |

STORAGE SYSTEM AND ENCRYPTION PROCESSING METHOD

CROSS-REFERENCE TO RELATED APPLICATION

The present application claims priority from Japanese application JP 2020-027615, filed on Feb. 20, 2020, the contents of which is hereby incorporated by reference into this application.

TECHNICAL FIELD

The present invention relates to a storage system and an encryption processing method.

BACKGROUND ART

Conventionally, there is the technology described in Japanese Unexamined Patent Application Publication No. 2007-124530 (PTL 1) for validating a decryption key. This publication provides the following description: "The object to be decrypted is encrypted digital data including an encryption code and encryption data, and a first decryption means 12a generates a decryption diagnosis code by performing decryption processing to the encryption code included therein, and a determination means 13 determines whether or not the decryption processing of the encryption code has been normally performed based on whether the generated decryption diagnosis code coincides with a predetermined validation code. A control means 15 permits the start of decryption of encryption data based on the second decryption means 12b when the decryption of the encryption code was normal, and prohibits the start of decryption of the encryption data when the decryption of the encryption code was not normal."

CITATION LIST

Patent Literature

[PTL 1] Japanese Unexamined Patent Application Publication No. 2007-124530

SUMMARY OF THE INVENTION

Problems to be Solved by the Invention

PTL 1 does not relate to technology which anticipates use in a storage system. With a storage system, the reliability of data is generally improved by the storage controller adding a check code, which is referred to as a DIF, to each of the data blocks, and providing a plurality of check points on a data transfer path in the storage system. Moreover, the storage controller has a function of encrypting, with an encryption processing device in the storage controller, a write data block in a final storage medium such as an HDD or an SSD. Nevertheless, when the DIF, which improves the reliability of the block data, is encrypted in the encryption processing, there is a problem in that the check of the DIF in the final storage medium will fail to function.

Moreover, in PTL 1, while the validation code can be arbitrarily set, when the configuration allows the validation code to be set arbitrarily, management of the validation code will become a problem. This is because it becomes necessary to ensure the reliability of the validation code itself. Furthermore, with a storage system, since data is read and written by being divided into a predetermined size (for example, 512 bytes), it is desirable that the processing pertaining to the encryption of divided data is performed automatically and at a low load, but the conventional technology represented by PTL 1 is not suitable therefor. As described above, when the conventional technology represented by PTL 1 is applied to a storage system, it will result in an increase in the data transfer load.

Thus, an object of the present invention is to enable encryption in a storage system while causing the check of the DIF to function at a low load in a storage device and improving the reliability.

Means to Solve the Problems

In order to achieve the foregoing object, with a representative storage system and encryption processing method of the present invention, foremost, a control device makes a write request upon adding an error check code and an expectation value for key validation to plain text data to be written. Next, an encryption processing device encrypts the expectation value for key validation and the plain text data, respectively, using a same encryption key, substitutes the error check code according to encrypted text data obtained by encrypting the plain text data, and stores the encrypted expectation value in the substituted error check code. Subsequently, a storage device performs a write error check using the substituted error check code, and then stores the encrypted text data to which the substituted error check code has been added. Thereafter, upon receiving a read request of the encrypted text data, the encryption processing device decrypts the encrypted expectation value stored in the substituted error check code using a decryption key, and validates whether the encryption key and the decryption key are properly corresponding.

Advantageous Effects of the Invention

According to the present invention, encryption can be performed at a low load in a storage system. Objects, configurations and effects other than those described above will become apparent based on the following embodiment.

DESCRIPTION OF EMBODIMENTS

An embodiment of the present invention is now explained with reference to the appended drawings.

Embodiments

Figure 1:
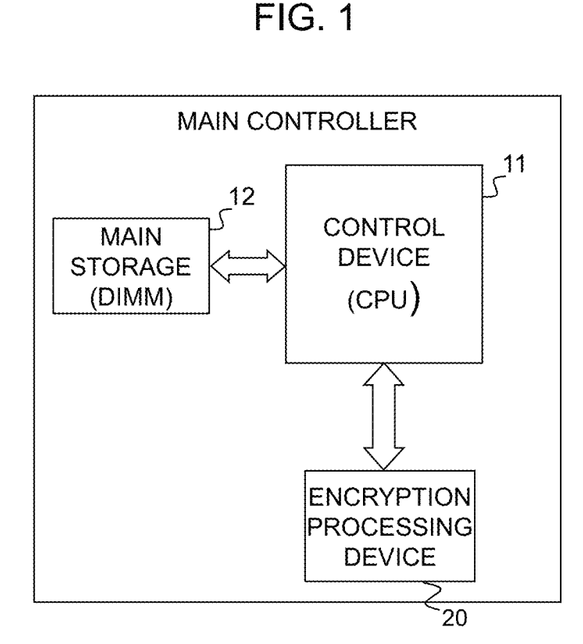
FIG. 1 is a configuration diagram of the main controller of the storage system.

FIG. 1 is a configuration diagram of the main controller of the storage system. The main controller includes one or more control devices (CPUs (Central Processing Units)). The storage system may also adopt a redundant configuration of comprising a plurality of main controllers.

The control device 11 uses one or more DIMMs (Dual Inline Memory Modules) as the main storage 12. The control device is connected to the storage device via the encryption processing device 20. The encryption processing device 20 is in charge of the encryption and decryption of data.

Figure 2:
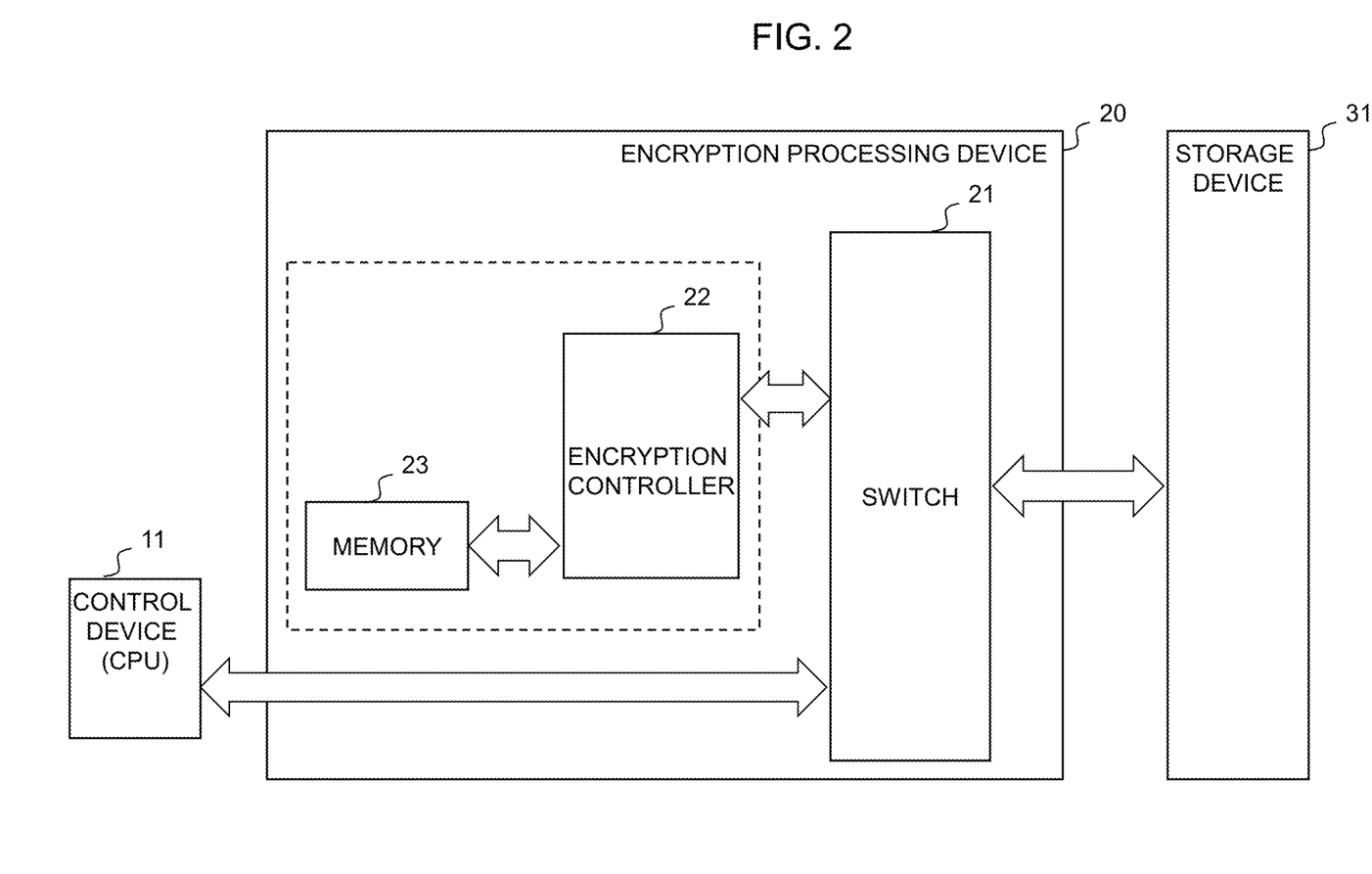
FIG. 2 is a configuration diagram of the encryption processing device.

FIG. 2 is a configuration diagram of the encryption processing device 20. The encryption processing device 20 internally connects the control device 11 and the storage device 31 with a switch 21.

Furthermore, the switch 21 is connected to an encryption controller 22. Moreover, the encryption controller 22 is connected to a memory 23. The encryption controller 22 uses the memory 23 for temporarily storing the encrypted text data. In other words, the encryption controller 22 and the memory 23 shown with the broken line in FIG. 2 will operate as function parts that are in charge of the encryption and decryption of data.

Figure 3:
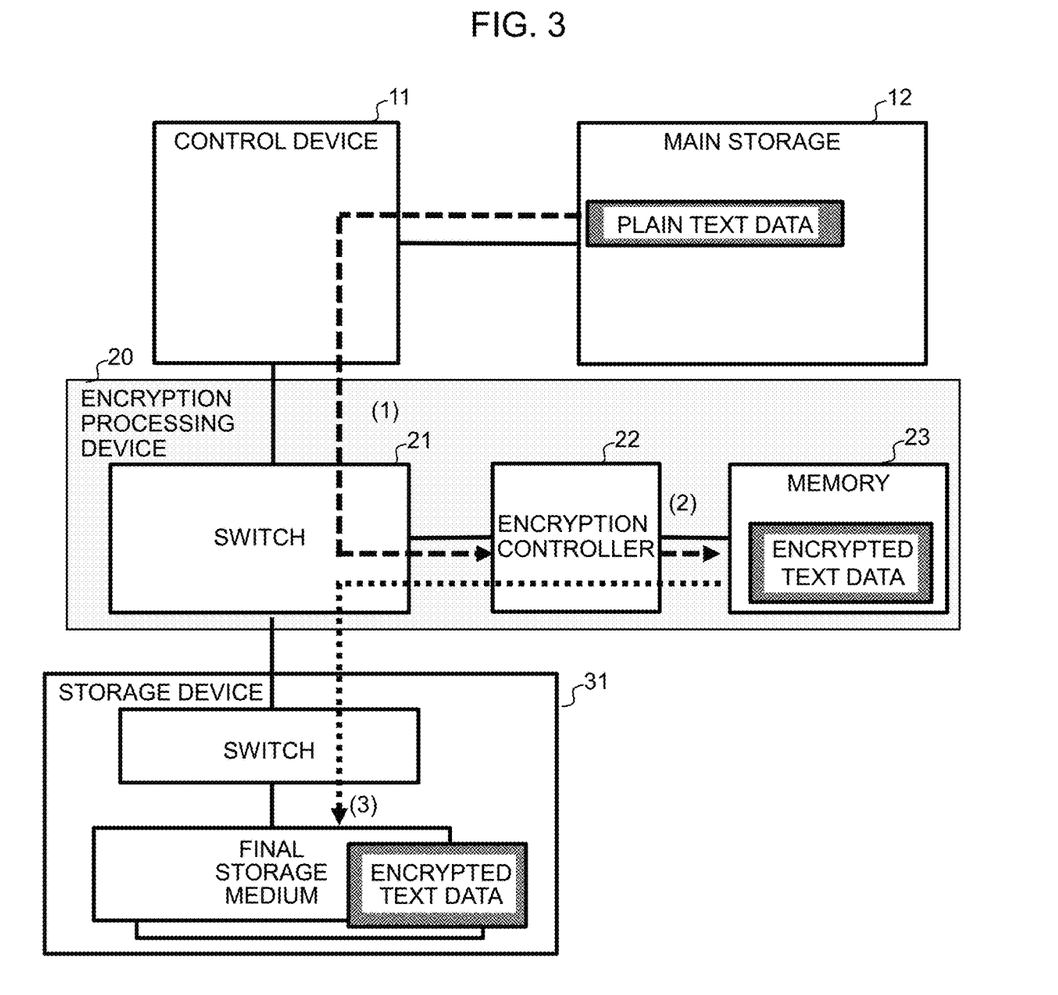
FIG. 3 is an explanatory diagram of the encryption processing.

FIG. 3 is an explanatory diagram of the encryption processing. The control device 11 foremost instructs the encryption processing device 20 to encrypt the plain text data stored in the main storage 12 (1).

The encryption controller 22 of the encryption processing device 20 encrypts the plain text data acquired from the main storage 12, and stores the encrypted text data in the memory 23 (2).

Subsequently, the control device 11 instructs the storage device 31 to write the encrypted text data. The storage device 31 includes a final storage medium such as an SSD (Solid State Drive). The storage device 31 reads the encrypted text data from the memory 23, and stores the encrypted text data in a logical address of the final storage medium designated by the control device 11 (3).

Figure 4:
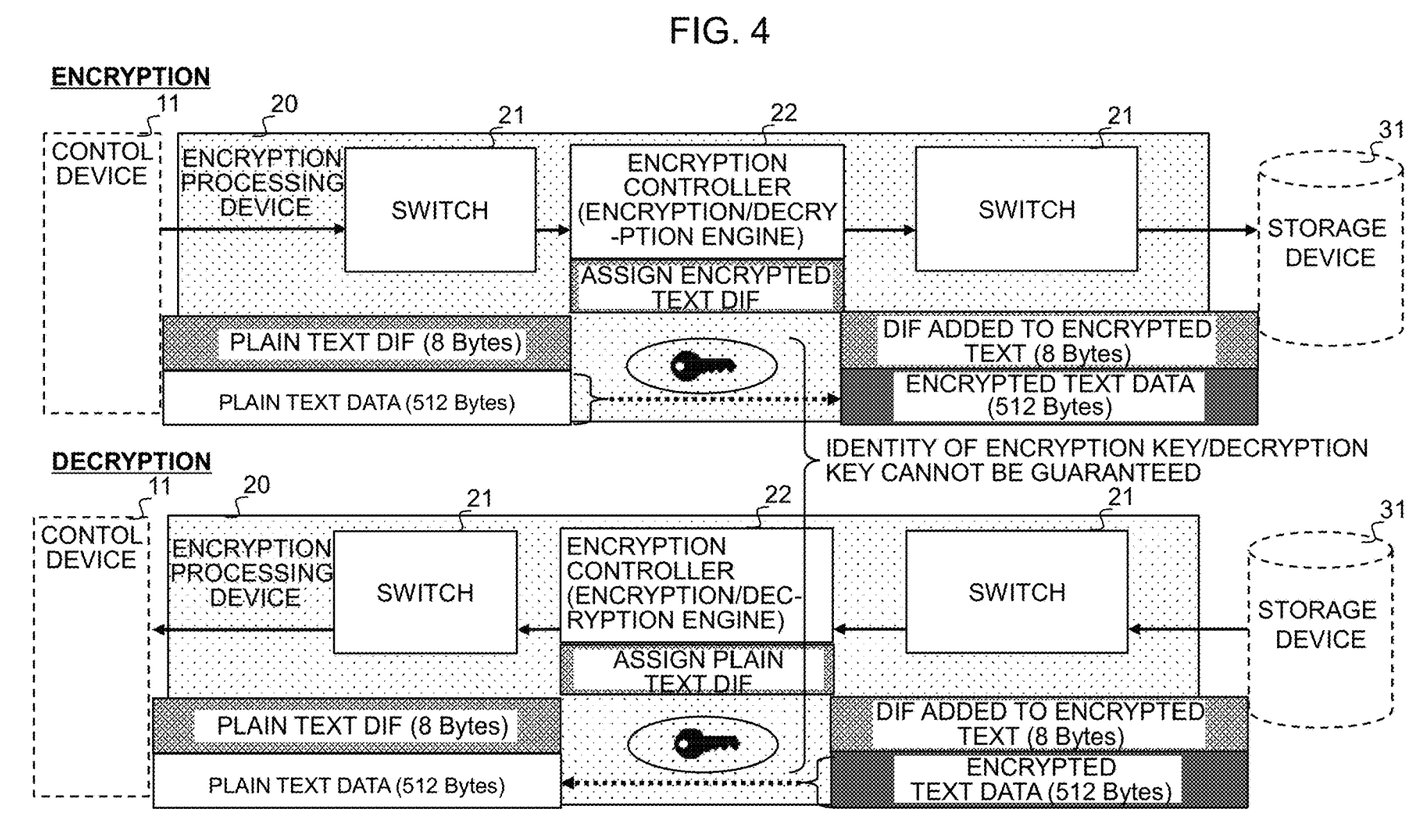
FIG. 4 is an explanatory diagram regarding the encryption key and the decryption key.

FIG. 4 is an explanatory diagram regarding the encryption key and the decryption key. When performing encryption, the control device 11 adds 8-byte plain text DIF to 512-byte plain text data, and instructs the encryption processing device 20 to perform encryption. The plain text DIF is an error check code corresponding to the plain text data. Upon receiving the instruction of performing encryption, the encryption controller 22 reads the plain text data added with the plain text DIF via the switch 21 of the encryption processing device 20.

The encryption controller 22 operates as an encryption/decryption engine, encrypts the read 512-byte plain text data using an encryption key designated by the control device 11, and thereby generates 512-byte encrypted text data. Moreover, the encryption controller 22 generates 8-byte encrypted text DIF as an error check code corresponding to the encrypted text data, and performs the substitution of the error check code. Subsequently, the control device 11 instructs the storage device 31 to write the encrypted text data, and the storage device 31 stores the 512-byte encrypted text data added with the 8-byte encrypted text DIF.

Meanwhile, when performing decryption, the control device 11 foremost instructs the storage device 31 to read the encrypted text data, and the storage device 31 writes the 512-byte encrypted text data added with the 8-byte encrypted text DIF in the encryption processing device 20. The switch 21 of the encryption processing device sends the encrypted text data added with the encrypted text DIF to the encryption controller 22.

Subsequently, the control device 11 instructs the encryption processing device 20 to decrypt the encrypted text data. Upon receiving the instruction of performing decryption, the encryption controller 22 operates as an encryption/decryption engine, decrypts the 512-byte encrypted text data using a decryption key designated by the control device 11, and thereby generates 512-byte plain text data. Moreover, the encryption controller 22 generates 8-byte plain text DIF as an error check code corresponding to the plain text data, and performs the substitution of the error check code. Subsequently, the encryption controller 22 sends, via the switch 21, the 512-byte plain text data added with the 8-byte plain text DIF to a logical address of the main storage designated by the control device 11.

As a result of adopting a configuration of encrypting the plain text data and generating the encrypted text data, and adding a corresponding encrypted text DIF to the encrypted text data as shown in FIG. 4, the storage device 31 can perform a DIF check upon reading and writing the encrypted text data. Nevertheless, since there is no information indicating the correspondence of the plain text data before encryption and the plain text data obtained as a result of decrypting the encrypted text data only with the foregoing configuration, it is not possible to guarantee that the encryption key and the decryption key are properly corresponding. Note that, since this embodiment indicates a case of using private key encryption, the encryption key and the decryption key will be the same in a state where "the encryption key and the decryption key are properly corresponding".

Thus, the storage system according to this embodiment uses, as the expectation value for key validation, a value that is uniquely identified upon reading and writing same data with the storage system. As the expectation value, used may be a logical address as the storage location of data, or a value that is identified from the logical address. The logical address is designated by the control device 11 for both the writing and reading of data, and is the same at the time of writing and at the time of reading. Moreover, the logical address remains encrypted and is not changed. Thus, the logical address itself, or the value that is identified from the logical address, can be used as the expectation value. Specifically, the correspondence table of the logical address and the expectation value may be retained in the control device 11, or a high-order bit of the logical address as the storage location of the encrypted text data may be used. Moreover, if a low-order bit of the logical address is included in the error check code as the code for detecting a write error, the logical address may be indicated based on a combination of the low-order bit, and the high-order bit as an expectation value.

The validation of the key based on the expectation value is now explained. Foremost, when making a write request, the control device 11 designates the logical address as the write destination in the storage device 31, and the encryption key to be used for the encryption, and stores the expectation value defined based on the logical address in the DIF code of the plain text data. The encryption processing device 20 encrypts the expectation value and the plain text data, respectively, using the same encryption key. Furthermore, the encryption processing device 20 substitutes the error check code according to the encrypted text data obtained by encrypting the plain text data, and stores the encrypted expectation value in the encrypted text DIF as the substituted error check code. The storage device 31 performs a write error check using the encrypted text DIF, and then stores the encrypted text data added with the encrypted text DIF.

Upon making a read request, the control device 11 designates the logical address as the read source from the storage device 31, and the decryption key to be used for decryption. The encryption processing device 20 decrypts the encrypted expectation value stored in the encrypted text DIF using the decryption key, and validates the key by comparing the expectation value at the time of reading identified from the logical address of the read source of the encrypted text data, and the expectation value at the time of writing obtained based on the decryption. If the expectation value at the time of reading and the expectation value at the time of writing obtained based on the decryption coincide, the encryption processing device 20 determines that the encryption key and the decryption key are properly corresponding (encryption key and decryption key are the same), and outputs the decryption result of the encrypted text data.

Figure 5:
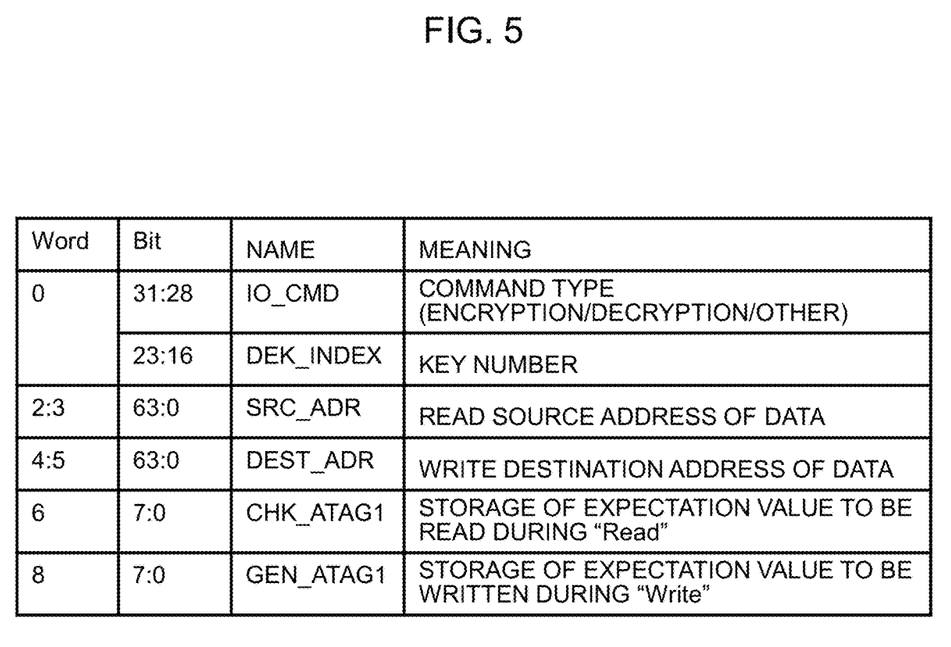
FIG. 5 is an explanatory diagram regarding requests from the control device.

FIG. 5 is an explanatory diagram regarding requests from the control device 11. In FIG. 5, important items related to this embodiment have been extracted from the format of commands used by the control device 11 for making write requests and read requests.

Specifically, Bit 31:28 of Word 0 has the name of "IO_CMD", and shows the command type (encryption/decryption/other). Bit 23:16 of Word 0 has the name of "DEK_INDEX", and shows the key number.

Bit 63:0 of Word 2:3 has the name of "SRC_ADR", and shows the read source address of data. Bit 63:0 of Word 4:5 has the name of "DEST_ADR", and shows the write destination address of data.

Bit 7:0 of Word 6 has the name of "CHK_ATAG1", and stores the expectation value to be read during "Read". Bit 7:0 of Word 8 has the name of "GEN_ATAG1", and stores the expectation value to be written during "Write".

Figure 6:
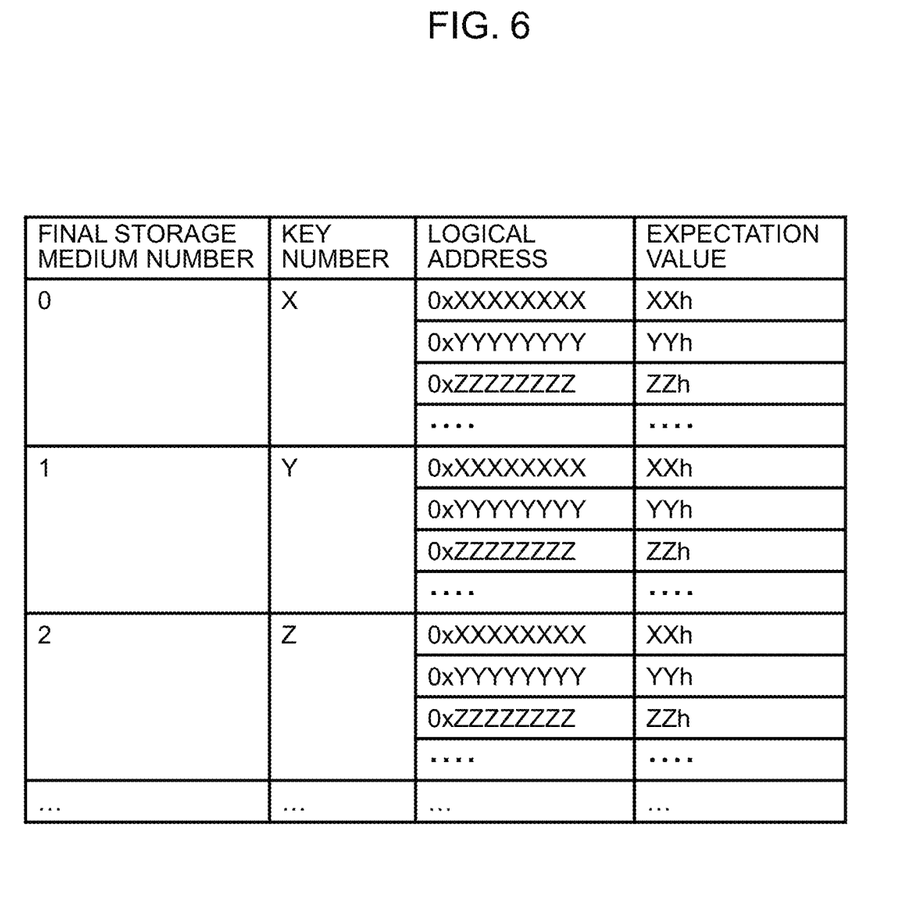
FIG. 6 is an explanatory diagram of the expectation value management table.

FIG. 6 is an explanatory diagram of the expectation value management table managed by the control device 11. As shown in FIG. 6, the expectation value management table has a structure in which a final storage medium number, a key number, a logical address, and an expectation value are associated.

For example, when the final storage medium number is "0", the key number is "X", and the logical address is "0xXXXXXXXX", then the expectation value is "XXh". Moreover, when the final storage medium number is "1", the key number is "Y", and the logical address is "0xYYYYYYYY", then the expectation value is "YYh". Furthermore, when the final storage medium number is "2", the key number is "Z", and the logical address is "0x77777777", then the expectation value is "ZZh". In FIG. 6, while the key number is different in correspondence with the final storage medium number, the expectation value is associated with the logical address without depending on the final storage medium number or the key number.

Figure 7:
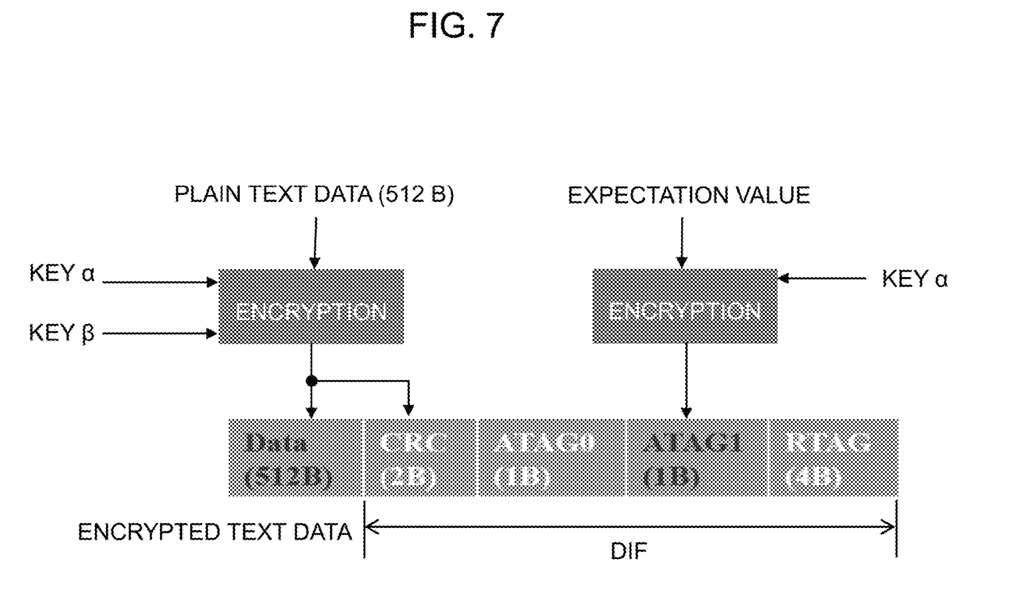
FIG. 7 is an explanatory diagram regarding the encryption of the expectation value.

FIG. 7 is an explanatory diagram regarding the encryption of the expectation value. In FIG. 7, 512-byte plain text data is encrypted using a key α and a key β, and 512-byte encrypted text data is thereby generated. Moreover, since a CRC (Cyclic Redundancy Check) of the original plain text cannot be used due to the encryption, the CRC is generated by the encrypted text data and written into the DIF. Moreover, the expectation value is encrypted with the key α, and stored in ATAG1 of the DIF. Note that 2 bytes are assigned to the CRC, and 1 byte is assigned to ATAG1. Otherwise, 1-byte ATAG0 and 4-byte RTAG are included in the DIF.

In FIG. 7, two encryption keys are used for the encryption of the plain text data, and one encryption key is used for the encryption of the expectation value. This is because different encryption methods are used for the encryption of the plain text data and the encryption of the expectation value. For example, an encryption method that gives preference to the processing speed is used for the encryption of the expectation value, and an encryption method that gives preference to the protective strength is used for the encryption of the plain text data. As described above, so as long as a key that is uniquely identified based on the designation of the control device 11 is used, different encryption methods may be used for the encryption of the plain text data and the encryption of the expectation value.

Figure 8:
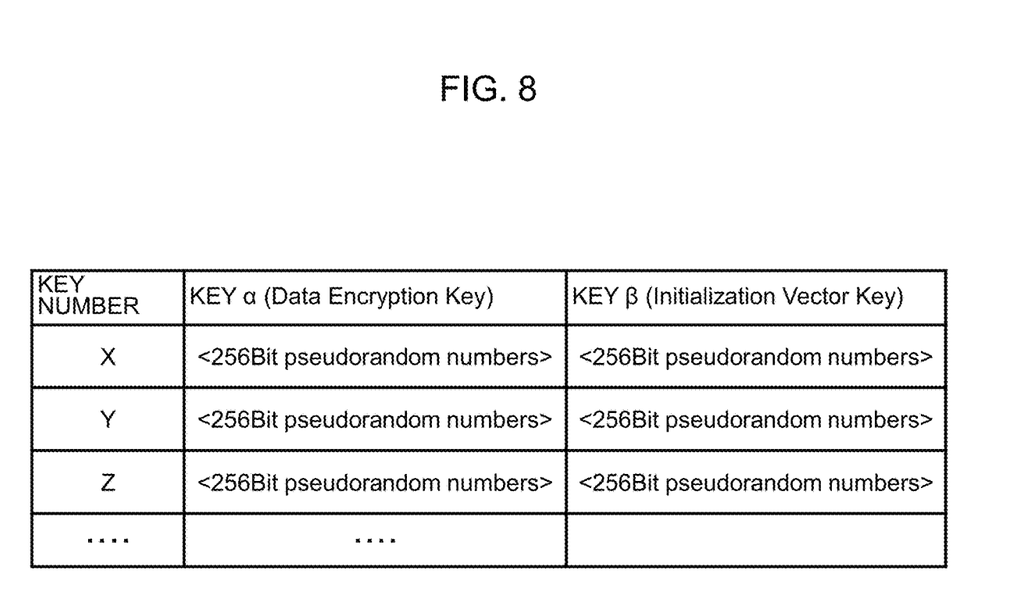
FIG. 8 is an explanatory diagram of the key management table.

FIG. 8 is an explanatory diagram of the key management table. The key management table shown in FIG. 8 is retained in the encryption controller 22. In FIG. 8, the key a and the key β are associated in relation to the key number. The key α is a Data Encryption Key, and the key β is an Initialization Vector Key. The key α and the key 1 are both generated with 256-bit pseudorandom numbers.

Figure 9:
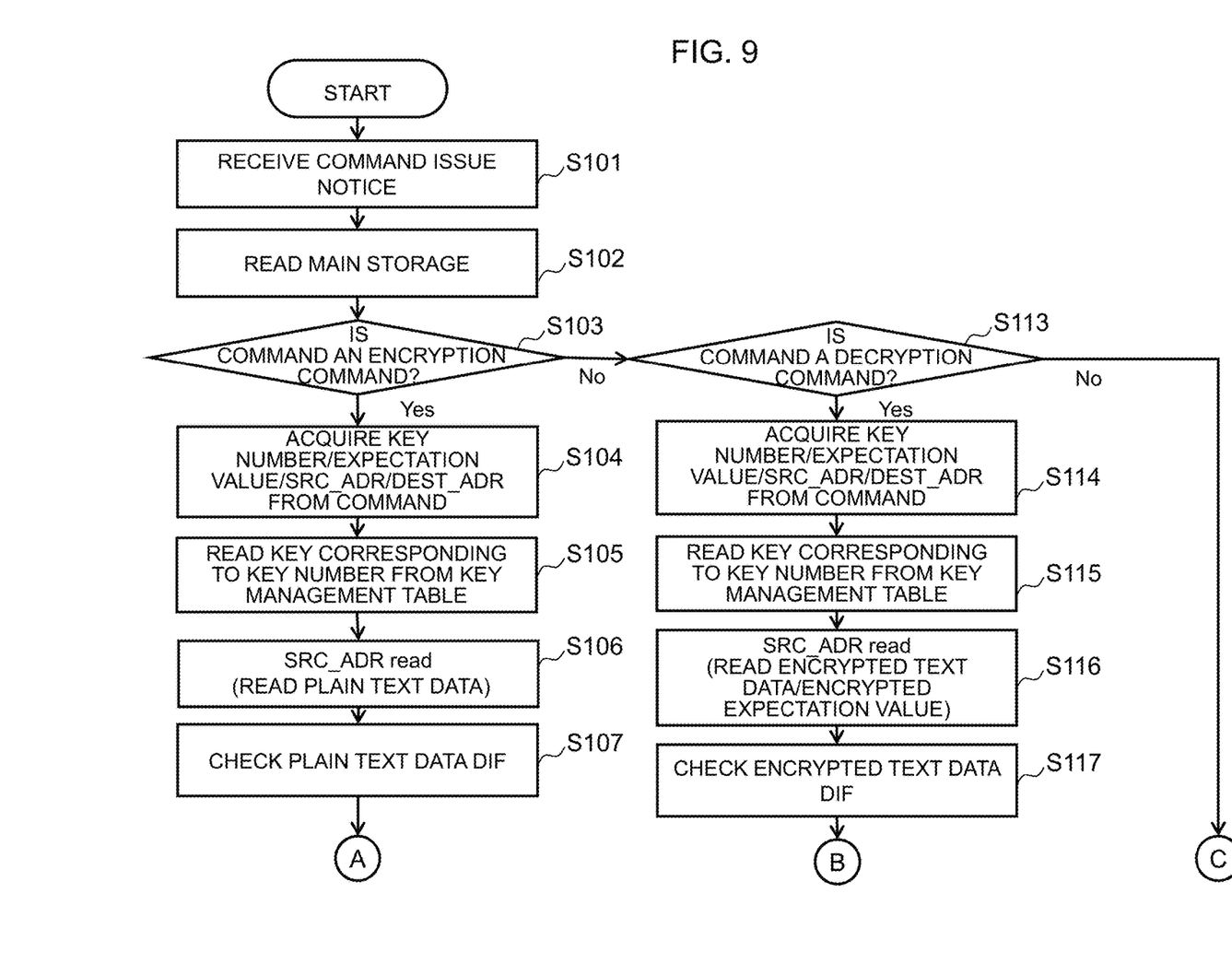
FIG. 9 is a flowchart (part 1) showing the processing routine of the encryption controller.
Figure 10:
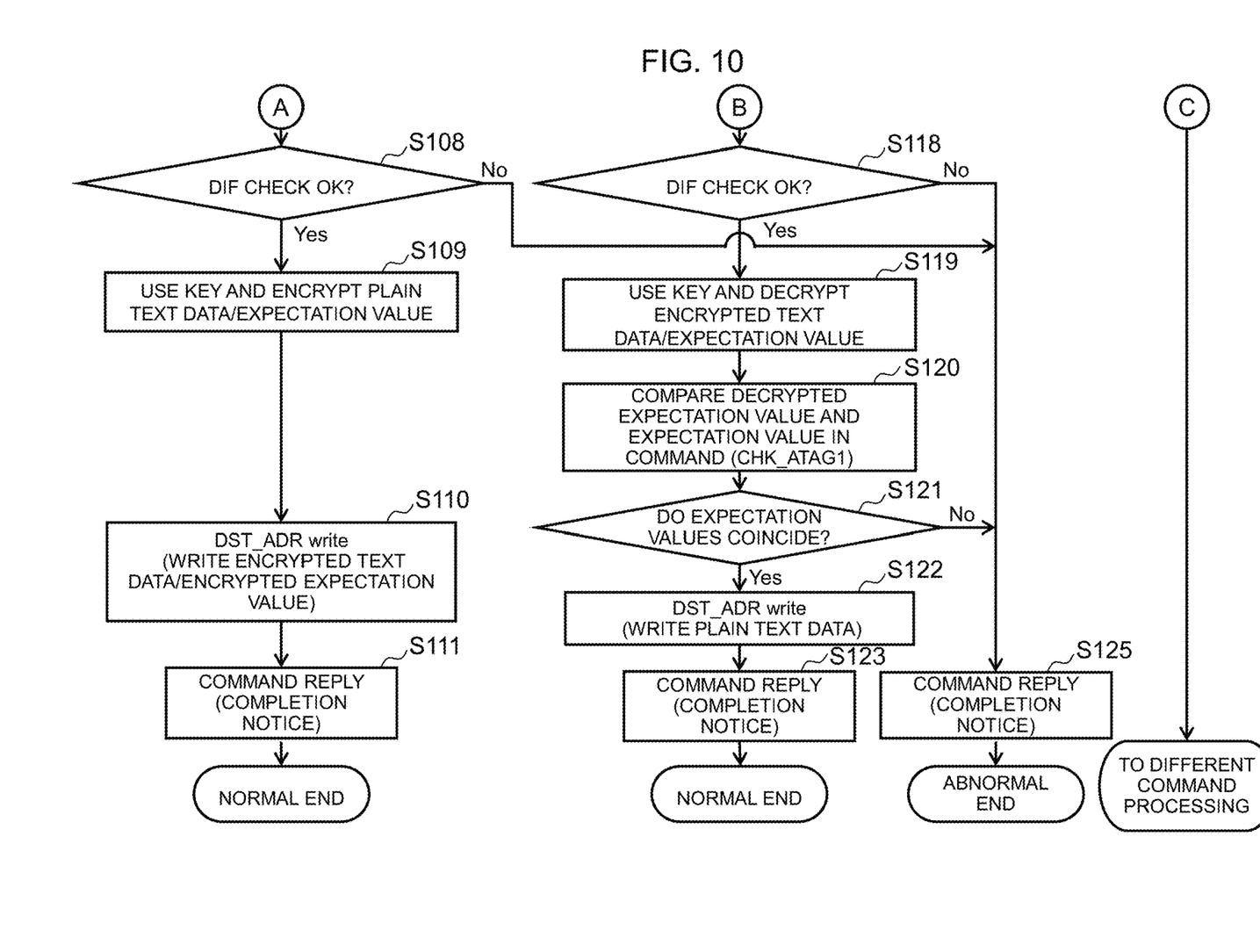
FIG. 10 is a flowchart (part 2) showing the processing routine of the encryption controller.

The processing routine of the encryption controller 22 is now explained. FIG. 9 and FIG. 10 are flowcharts showing the processing routine of the encryption controller 22. Foremost, the encryption controller 22 receives a command issue notice (step S101), and reads the main storage (step S102).

The encryption controller 22 determines whether the command is an encryption command (step S103). If the command is an encryption command (step S103; Yes), the encryption controller 22 acquires the key number, the expectation value, the read source logical address (SRC_ADR), and the write destination logical address (DEST_ADR) from the command (step S104).

After step S104, the encryption controller 22 reads the key corresponding to the key number from the key management table (step S105), and reads the plain text data from the read source logical address (SRC_ADR) (step S106). Subsequently, the encryption controller 22 performs a DIF check of the plain text data (step S107) and, if the DIF check is OK (step S108; Yes), uses the key to encrypt the plain text data and the expectation value (step S109).

After step S109, the encryption controller 22 generates an encrypted text DIF storing the encrypted expectation value, and writes the encrypted text data added with the encrypted text DIF in the write destination logical address (DEST_ADR) (step S110).

The encryption controller 22 thereafter sends a reply to the command (step S111), and normally ends the processing routine.

Meanwhile, if the command is not an encryption command, the encryption controller 22 determines whether the command is a decryption command (step S113). If the command is a decryption command (step S113; Yes), the encryption controller 22 acquires the key number, the expectation value, the read source logical address (SRC_ADR), and the write destination logical address (DEST_ADR) from the command (step S114).

After step S114, the encryption controller 22 reads the key corresponding to the key number from the key management table (step S115), and reads the encrypted text data and the encrypted expectation value from the read source logical address (SRC_ADR) (step S116). Subsequently, the encryption controller 22 performs a DIF check of the encrypted text data (step S117) and, if the DIF check is OK (step S118; Yes), uses the key to decrypt the encrypted text data and the expectation value (step S119).

After step S119, the encryption controller 22 compares the decrypted expectation value and the expectation value (CHK_ATAG1) in the command (step S120). If the expectation values coincide (step S121; Yes), the encryption controller 22 writes the decrypted plain text data in the write destination logical address (DEST_ADR) (step S122). The encryption controller 22 thereafter sends a reply to the command (step S123), and normally ends the processing routine.

Note that, if the DIF check is not OK (step S108; No, or step S118; No), the encryption controller 22 sends a reply to the command (step S125), and abnormally ends the processing routine. Similarly, if the expectation values do not coincide (step S121; No), the encryption controller 22 sends a reply to the command (step S125), and abnormally ends the processing routine. If the command was also not a decryption command (step S113; No), the encryption controller 22 performs the processing of a different command, but the explanation thereof is omitted here.

Figure 11:
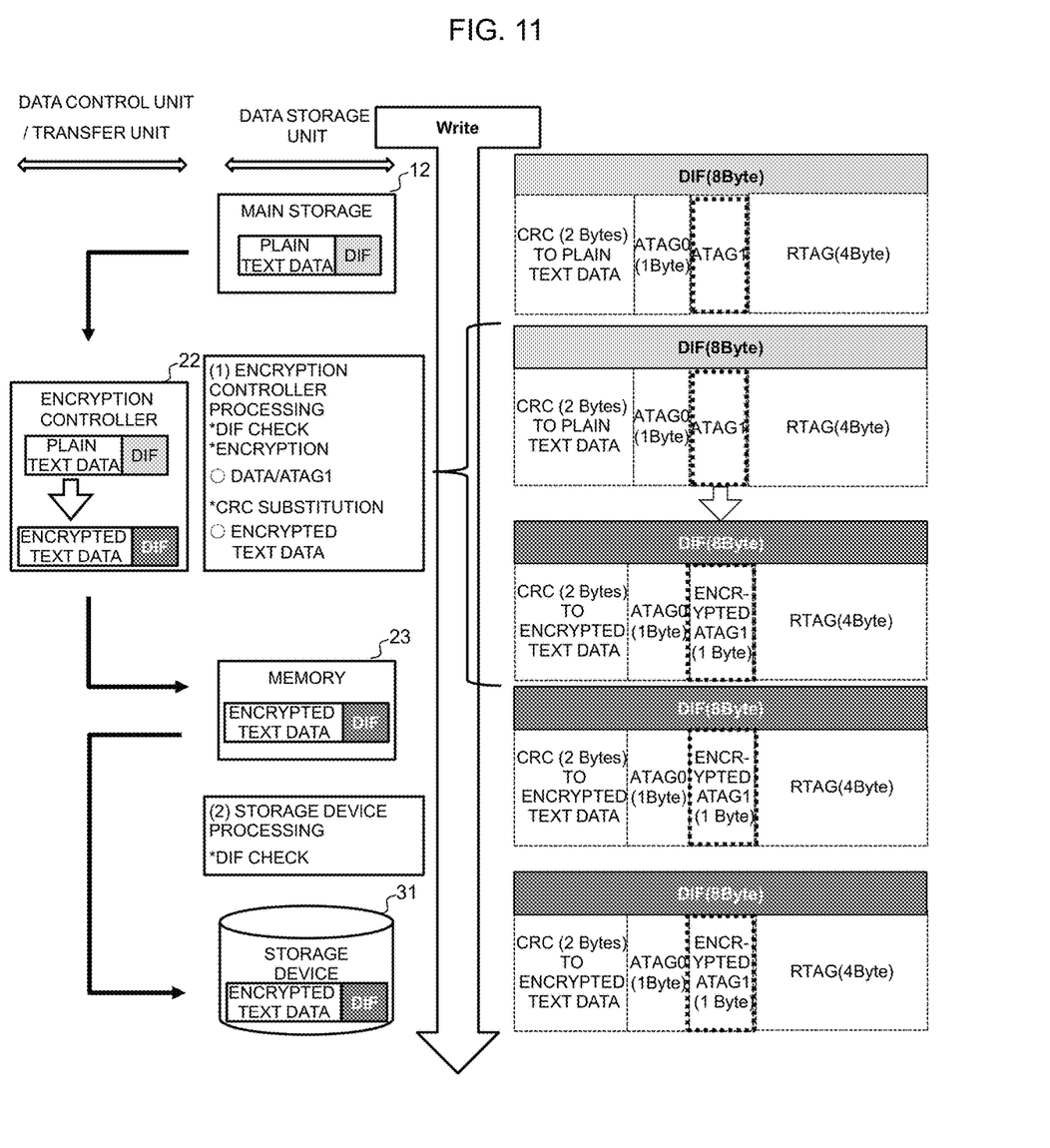
FIG. 11 is an explanatory diagram regarding the rewriting of the DIF at the time of writing.

The rewriting of the DIF is now explained. FIG. 11 is an explanatory diagram regarding the rewriting of the DIF at the time of writing. In FIG. 11, foremost, the plain text data is stored in the logical address of the main storage as the data storage unit. Here, the DIF (8 Bytes) includes 2-byte CRC to the plain text data, as well as 1-byte ATAG0, 1-byte ATAG1, and 4-byte RTAG.

The encryption controller 22 of the encryption processing device 20 functions as a data control unit and a transfer unit, and stores the plain text data of the main storage 12, as the encrypted text data, in the memory 23.

The processing of the encryption controller 22 is the DIF (CRC) check, encryption of the expectation value, data writing of ATAG1, CRC substitution, and generation of the encrypted text data. Consequently, the 2-byte CRC to the plain text data is substituted with the 2-byte CRC to the encrypted text data. Moreover, 1 byte of the encrypted expectation value is stored in ATAG1.

The encryption controller 22 adds an encrypted text DIF to the encrypted text data, and temporarily stores the encrypted text data added with the encrypted text DIF in the memory 23 as the data storage unit. The storage device 31 thereafter performs a DIF check of the CRC and the LA, and writes the encrypted text data added with the encrypted text DIF in the final storage medium.

Figure 12:
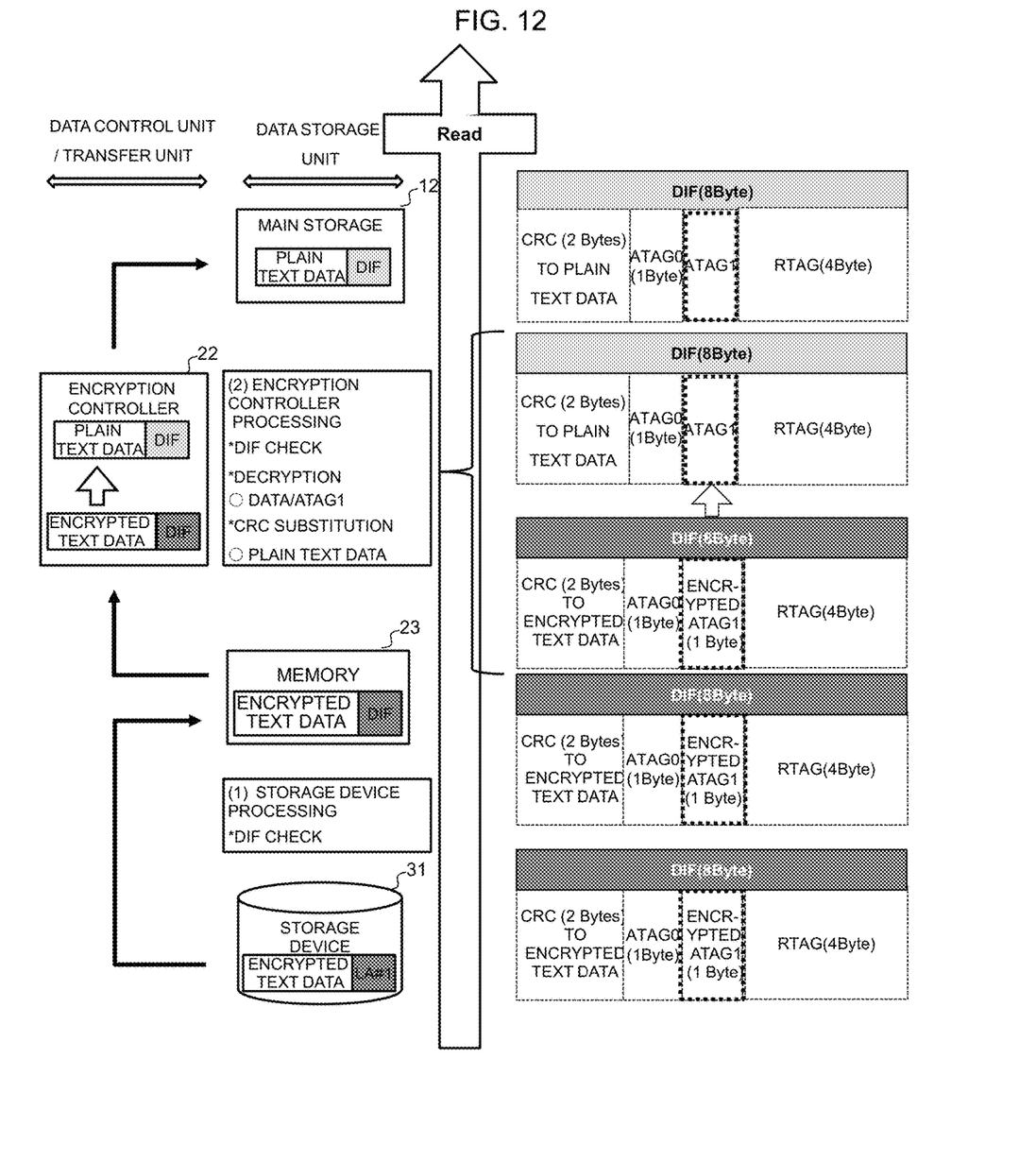
FIG. 12 is an explanatory diagram regarding the rewriting of the DIF at the time of reading.

FIG. 12 is an explanatory diagram regarding the rewriting of the DIF at the time of reading. In FIG. 12, the encrypted text data is stored in the final storage medium of the storage device 31. Here, the DIF (8 Bytes) includes 2-byte CRC to the encrypted text data, as well as 1-byte ATAG1 in which the encrypted expectation value is written therein.

The storage device 31 performs a DIF (CRC) check to the encrypted text data, and stores the encrypted text data in the memory 23 of the encryption processing device 20.

The encryption controller 22 of the encryption processing device 20 functions as a data control unit and a transfer unit, and stores the encrypted text data of the memory 23, as the plain text data, in the main storage 12.

The processing of the encryption controller 22 is the DIF (CRC) check, decryption of the expectation value, CRC substitution, and generation of the plain text data.

Consequently, the 2-byte CRC to the encrypted text data is substituted with the 2-byte CRC to the plain text data.

The encryption controller 22 adds a plain text DIF to the plain text data, and writes the plain text data added with the plain text DIF in the main storage 12 as the data storage unit.

As described above, according to the storage system and encryption processing method disclosed in this embodiment, the control device 11 makes a write request upon adding an error check code to plain text data to be written, and the encryption processing device 20 encrypts an expectation value for key validation and the plain text data, respectively, using a same encryption key, substitutes the error check code according to encrypted text data obtained by encrypting the plain text data, and stores the encrypted expectation value in the substituted error check code. Furthermore, the storage device 31 performs a write error check using the substituted error check code, and then stores the encrypted text data to which the substituted error check code has been added. Moreover, upon receiving a read request of the encrypted text data, the encryption processing device 20 decrypts the encrypted expectation value stored in the substituted error check code using a decryption key, and validates whether the encryption key and the decryption key are properly corresponding.

Thus, in the storage system, the key can be validated within the framework of the DIF and encryption can be performed without having to add an additional validation code.

Moreover, a value that is uniquely identified upon reading and writing same data may be used as the expectation value, and the encryption processing device determines that the encryption key and the decryption key are properly corresponding when an expectation value at time of reading identified based on reading of the encrypted text data and an expectation value at time of writing obtained by decrypting the encrypted expectation value coincide. Thus, the processing pertaining to encryption can be performed automatically and at a low load.

Specifically, the expectation value may be associated with a storage location address of the encrypted text data in the storage device. Furthermore, the expectation value may be a high-order bit of a storage location address of the encrypted text data in the storage device, and may indicate the storage location address based on a combination with a low-order bit of the storage location address included in the error check code.

Moreover, according to this embodiment, upon making the write request, the control device designates a storage location address as a write destination in the storage device and the encryption key to be used for encryption, and stores the expectation value, which is determined based on the storage location address as the write destination, in a part of the error check code, and the encryption processing device encrypts the plain text data using the designated encryption key, and encrypts the expectation value read from the error check code.

Moreover, according to this embodiment, upon making the read request, the control device designates a storage location address as a read source from the storage device, and the decryption key to be used for decryption, and the encryption processing device decrypts the encrypted expectation value stored in the substituted error check code with the designated decryption key, and outputs a decryption result of the encrypted text data on the condition of the decrypted expectation value coinciding with the expectation value identified from the storage location address as the read source.

Moreover, according to this embodiment, the encryption processing device may use different encryption methods for the encryption of the plain text data and the encryption of the expectation value.

Note that the present invention is not limited to the embodiment described above, and includes various modified examples. For example, the foregoing embodiment was explained in detail for explaining the present invention in an easier-to-understand manner, and the present invention is not necessarily limited to a type which comprises all of the configurations explained above. Moreover, without limitation to the deletion of a certain configuration, a configuration may also be substituted or added.

For example, the expectation value does not necessarily need to be retained as data of a table, and the configuration may also be such that the expectation value is calculated from the address.

REFERENCE SIGNS LIST

11: control device, 12: main storage, 20: encryption processing device, 21: switch, 22: encryption controller, 23: memory, 31: storage device

The invention claimed is:

1. A storage system, comprising:
one or more central processing units (CPUs);
one or more memories coupled to the one or more CPUs, wherein the one or more CPUs are configured to:
create a write request upon adding an error check code to plain text data to be written,
encrypt an expectation value for key validation and the plain text data, respectively, using a same encryption key, substitute the error check code according to encrypted text data obtained by encrypting the plain text data, and store the encrypted expectation value in the substituted error check code,
perform a write error check using the substituted error check code, and then store the encrypted text data to which the substituted error check code has been added, and
upon receiving a read request of the encrypted text data, decrypt the encrypted expectation value stored in the substituted error check code using a decryption key, and validate whether the encryption key and the decryption key correspond,
wherein the expectation value is a value that is uniquely identified upon reading and writing same data, and
wherein the one or more CPUs are configured to determine that the encryption key and the decryption key correspond when an expectation value at time of reading identified based on reading of the encrypted text data and an expectation value at time of writing obtained by decrypting the encrypted expectation value coincide.

2. The storage system according to claim 1, wherein the expectation value corresponds to a storage location address of the encrypted text data in the one or more memories.

3. The storage system according to claim 1, wherein the expectation value is a high-order bit of a storage location address of the encrypted text data in the storage device, and indicates the storage location address based on a combination with a low-order bit of the storage location address included in the error check code.

4. The storage system according to claim 1, wherein the one or more CPUs are configured to, upon creating the write request, designate a storage location address as a write destination in the storage device and the encryption key to be used for encryption, and store the expectation value, which is determined based on the storage location address as the write destination, in a part of the error check code, and
encrypt the plain text data using the designated encryption key, and encrypt the expectation value read from the error check code.

5. The storage system according to claim 1, wherein the controller is configured to, upon creating the read request, designate a storage location address as a read source from the one or more memories, and the decryption key to be used for decryption, and
decrypt the encrypted expectation value stored in the substituted error check code with the designated decryption key, and output a decryption result of the encrypted text data on the condition of the decrypted expectation value coinciding with the expectation value identified from the storage location address as the read source.

6. The storage system according to claim 1, wherein the encryption processing device uses different encryption for the encryption of the plain text data and the encryption of the expectation value.

7. An encryption processing method executed by one or more central processing units (CPUs), the one or more CPUs executing steps, comprising:
creating a write request upon adding an error check code to plain text data to be written;
encrypting an expectation value for key validation and the plain text data, respectively, using a same encryption key, substituting the error check code according to encrypted text data obtained by encrypting the plain text data, and storing the encrypted expectation value in the substituted error check code;
performing a write error check using the substituted error check code, and then storing the encrypted text data to which the substituted error check code has been added; and
upon receiving a read request of the encrypted text data, decrypting the encrypted expectation value stored in the substituted error check code using a decryption key, and validates whether the encryption key and the decryption key correspond,
wherein the expectation value is a value that is uniquely identified upon reading and writing same data, and
wherein the method further comprising determining that the encryption key and the decryption key correspond when an expectation value at time of reading identified based on reading of the encrypted text data and an expectation value at time of writing obtained by decrypting the encrypted expectation value coincide.

* * * * *